(12) United States Patent
Shatford

(10) Patent No.: US 7,155,416 B2
(45) Date of Patent: Dec. 26, 2006

(54) BIOMETRIC BASED AUTHENTICATION SYSTEM WITH RANDOM GENERATED PIN

(75) Inventor: Will Shatford, La Canada, CA (US)

(73) Assignee: Tri-D Systems, Inc., La Canada, CA (US)

( * ) Notice: Subject to any disclaimer, the term of this patent is extended or adjusted under 35 U.S.C. 154(b) by 388 days.

(21) Appl. No.: 10/613,481

(22) Filed: Jul. 3, 2003

(65) Prior Publication Data

US 2004/0030660 A1  Feb. 12, 2004

Related U.S. Application Data

(60) Provisional application No. 60/393,614, filed on Jul. 3, 2002.

(51) Int. Cl.
*G06Q 99/00* (2006.01)

(52) U.S. Cl. ............................ 705/67; 705/64; 705/65; 705/72; 705/76; 713/182; 713/186

(58) Field of Classification Search ............ 705/64–79; 713/182, 186, 162
See application file for complete search history.

(56) References Cited

U.S. PATENT DOCUMENTS

| | | |
|---|---|---|
| 4,582,985 A | 4/1986 | Lofberg |
| 4,614,861 A | 9/1986 | Pavlov et al. |
| 4,896,363 A | 1/1990 | Taylor et al. |
| 4,993,068 A | 2/1991 | Piosenka et al. |
| 5,426,708 A | 6/1995 | Hamada et al. |
| 5,450,491 A | 9/1995 | McNair |
| 5,467,403 A | 11/1995 | Fishbine et al. |
| 5,473,144 A | 12/1995 | Mathurin, Jr. |
| 5,513,272 A | 4/1996 | Bogosian et al. |
| 5,566,327 A | 10/1996 | Sehr |
| 5,594,806 A | 1/1997 | Colbert |
| 5,623,552 A | 4/1997 | Lane |
| 5,648,648 A | 7/1997 | Chou et al. |
| 5,712,473 A | 1/1998 | Nagashio |
| 5,719,950 A | 2/1998 | Osten et al. |
| 5,777,903 A | 7/1998 | Piosenka et al. |

(Continued)

FOREIGN PATENT DOCUMENTS

CA  2291430  *  7/2000

(Continued)

OTHER PUBLICATIONS

Axner, David H., "Access and authentication: key issues in network security.", Business COmmunications Review, v21, n3, p. 61(6).*

(Continued)

*Primary Examiner*—Jalatee Worjloh
(74) *Attorney, Agent, or Firm*—Evelyn H. McConathy; Drinker, Biddle & Reath, LLP

(57) ABSTRACT

Provided are apparatus, system and methods for accessing information utilizing an authentication system for verifying that a user is an authorized user of the information access device, and that activation of the device is valid to access the information. The authentication system included in the device issued to an authorized user, reads a user's fingerprint using a reader and compares the user's fingerprint as read with a stored fingerprint of the authorized user of the device, thereby determining if the user is the authorized user. If the user is the authorized user, a pseudo-random generator generates a personal identification number for use by the user to validate activation of the device for accessing information.

6 Claims, 4 Drawing Sheets

U.S. PATENT DOCUMENTS

| | | |
|---|---|---|
| 5,801,367 A | 9/1998 | Asplund et al. |
| 5,815,252 A | 9/1998 | Price-Francis |
| 5,825,005 A | 10/1998 | Behnke |
| 5,870,723 A | 2/1999 | Pare, Jr. et al. |
| 5,960,100 A | 9/1999 | Hargrove |
| 6,012,636 A | 1/2000 | Smith |
| 6,041,410 A | 3/2000 | Hsu et al. |
| 6,104,922 A | 8/2000 | Baumann |
| 6,122,737 A | 9/2000 | Bjorn et al. |
| 6,163,771 A | 12/2000 | Walker et al. |
| 6,167,517 A | 12/2000 | Gilchrist et al. |
| 6,219,439 B1 | 4/2001 | Burger |
| 6,230,148 B1 | 5/2001 | Pare, Jr. et al. |
| 6,282,304 B1 | 8/2001 | Novikov et al. |
| 6,317,834 B1 | 11/2001 | Gennaro et al. |
| 6,325,285 B1 | 12/2001 | Baratelli |
| 6,394,343 B1 | 5/2002 | Berg et al. |
| 2001/0018660 A1* | 8/2001 | Sehr ............................... 705/5 |
| 2004/0044482 A1* | 3/2004 | Takeda et al. ................. 702/19 |
| 2004/0268133 A1* | 12/2004 | Lee et al. ................... 713/186 |

FOREIGN PATENT DOCUMENTS

| | | | |
|---|---|---|---|
| EP | 1041523 | * | 10/2000 |
| WO | WO 01/75826 | * | 10/2001 |

OTHER PUBLICATIONS

RSA Security Website Page, http://www.rsasecurity.com/ (2004).
CrytoCard Website Page, http://www.cryptocard.com/ (2004).
Rainbow Technologies Website Page, http://www.rainbow.com/ (2004).
Secure Computing Website Page, http://www.securecomputing.com/ (2004).
ActivCard Website Page, http://www.activcard.com/ (2004).
VASCO Website Page, http://www.vasco.com/ (2004).
Biometric Associates, Inc. Website Page, http://www.biometricassociates.com/ (2004).
IDTEK Website Page, http://www.idtek.com/ (2004).
Kinetic Sciences, Inc. Website Page, http://www.kinetic.bc.ca/ (2004).

* cited by examiner (A)

(B)

BIOMETRIC BASED AUTHENTICATION SYSTEM WITH RANDOM GENERATED PIN

REFERENCE TO RELATED APPLICATIONS

This application claims priority to U.S. Provisional Application No. 60/393,614, filed Jul. 3, 2002, which disclosure is incorporated herein by reference.

BACKGROUND

The present invention relates generally to the access of information. More specifically, the present invention relates to the authentication and verification of a user requesting access to protected information.

Protection of information has become a larger issue as technology continues to expand. More and more individuals are finding ways of accessing corporate, individual or government protected information, which may be vital to their operations. This is particularly true in the case of credit card and computer fraud. Credit card fraud results in the loss of tens of millions of dollars to credit card companies. The losses occur at the hands of individuals who have stolen a cardholder's credit card, or individuals who have access to the cardholder's credit card number, and possibly his/her Personal Identification Number (PIN). With this information identity, thieves are able to purchase goods and services over the Internet, in stores, and over the phone without the threat of being caught.

Most of the credit cards have as a protection against such use by an unauthorized individual, a signature line on the back of the credit card. When the credit card is presented to a merchant, the merchant is supposed to then compare the signature of the purchaser with the signature on the back of the card. Some credit cards also have a small picture of the user on the front of the card to protect against unauthorized use. Some credit cards now include a multi-digit number on the back of the card that is requested when making a purchase; either in person, over the phone or over the Internet. Unfortunately, these methods are not at all fail proof. Merchants frequently fail to compare the signatures on the card with that of the purchaser, thereby allowing unauthorized uses to occur. In some cases, such as airport parking facilities, a signature isn't even required.

With the widespread use of debit cards, merchants have installed systems at the registers, wherein the purchaser no longer has to present a credit/debit card to the store clerk. The transaction is completed by the purchaser alone, either using a PIN for the debit card or simply signing electronically on a touch pad. Accordingly, the protections that were originally implemented to protect against unauthorized use, have now become moot.

Increasingly people, companies, and government agencies are conducting their business and communications on computer networks. Inadequate security and authentication practices expose these entities to anything from harassment and malicious use of private information to an array of criminal actions including theft and fraud. For their own protection, individuals are required to remember multiple log-ins, names, and passwords, and companies spend as much as $300 to $400/user/month administering password systems. In fact, the more security, the more the hassle for all parties, and the more the expense for the enterprise. There is a clear need for a strong, portable, cost-effective, and secure way to authenticate users and protect information.

Although 3-Factor authentication (what the user knows, what the user has, and who the user is) is considered the strongest, or most secure, form of ID authentication, it has not been widely accepted or implemented for many reasons including:

Special biometric readers required at the point-of-transaction and/or inconvenient user devices
Complex and expensive deployments
High maintenance costs
Necessity to create and maintain a database of user biometrics
Concerns regarding individual privacy In the absence of reasonable 3-Factor solutions, enterprises and applications requiring strong authentication have mostly employed 2-Factor solutions. However, since these solutions rarely include a biometric as one of the factors, the actual person behind a pass code or smart card can never be actually authenticated. This presents another set of common problems including:

Sharing passwords with unauthorized individuals
Stolen passwords and user devices
Unfamiliar, inconvenient, and application-specific user devices
Identity Theft
Repudiation of transactions Accordingly, there exists a need for an improved system and method for authenticating user access to protected information.

DESCRIPTION OF THE PREFERRED EMBODIMENT(S)

The present invention relates to a device which provides the cardholder with a secure method of transacting business and accessing information.

Figure 1:
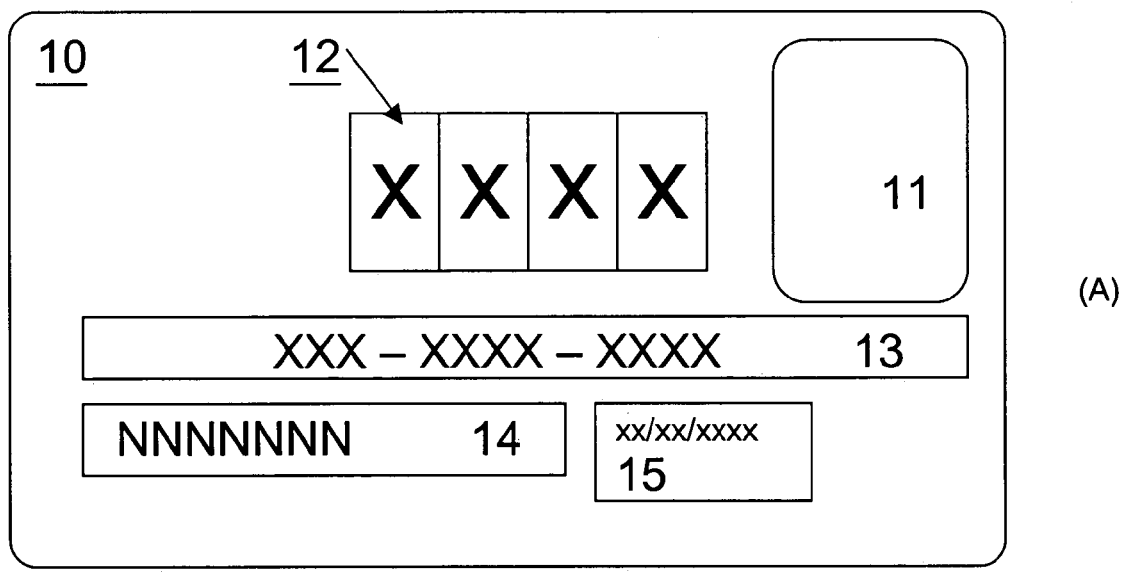
FIGS. 1(A) and 1(B) are block diagrams showing a front (A) and rear view (B) of the multi-purpose card 10 in accordance with a first preferred embodiment of the present invention.
Figure 1:
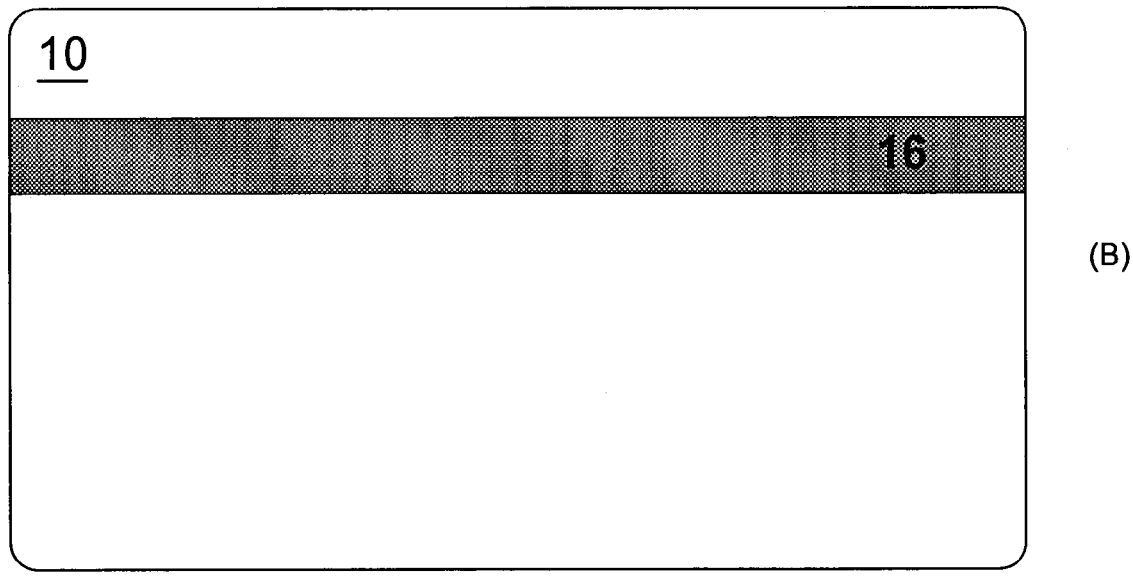

FIG. 1 is a block diagram showing a front and rear view of an exemplary device in accordance a preferred embodiment of the present invention, a multi-purpose card 10. The front of card 10, shown in FIG. 1(A), comprises a biometric sensing area 11, a display 12, an identification number area 13, a name area 14, and a date area 15. Identification number area 13 identifies the number by which the cardholder is identified in a network of a card issuer. This number may be associated with any type of card issuer, for example, a credit card issuer, an internet service provider, on-line service provider, a drivers license, a debit card, an ID card, and the like. For exemplary purposes, the card and identification number are associated with a credit card issued by a bank, although any issuer of an authentication card in accordance with the present invention may be utilized. Accordingly, it is preferable that date area 15 comprises a predetermined date after which the card is no longer valid. Name area 14 identifies the cardholder's name, i.e., the person who is authorized to use the card. The term "cardholder" throughout this disclosure is defined as an individual who has been issued card 10 by the card issuer and is named thereon.

Sensing area 11 comprises an area sensitive to any biometric object applied to its surface, such as a finger or thumb. As disclosed in more detail below, sensing area 11, is coupled to a reader which generates one or more signals associated with the object that is in contact with sensing area 11. Preferably sensing area 11 senses the touch of a finger or thumb for reading by the reader, as disclosed below.

Referring to the rear view or back of card 10 shown in FIG. 1(B), the back of card 10 comprises a magnetic strip 16. As those skilled in the art know, magnetic strip 16 comprises information specific to the cardholder, such as the cardholder's identification number, name, type of card held, and any other information that the card issuer wishes to incorporate thereon.

Although, card 10 has been described as being associated with a single card issuer, it should be noted that card 10 may be used for many purposes and comprise information about the cardholder in association with a plurality of card issuers. For purposes of this disclosure, a "card issuer" is defined as any business or organization capable of associating a card holder with, the business' or organization's services using the cardholder's identification number on the front of card 10 or on magnetic strip 16 on the back of card 10.

Figure 2:
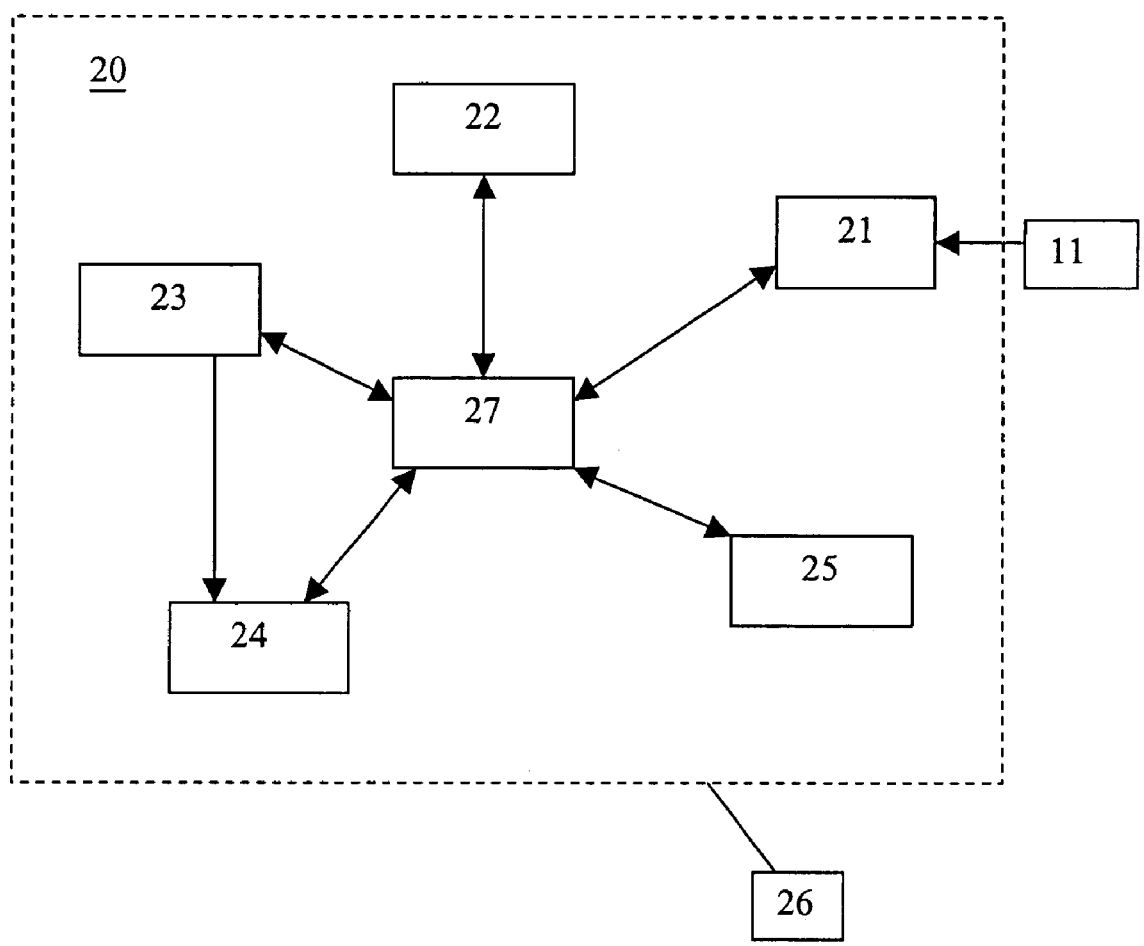
FIG. 2 is a block diagram depicting the card in accordance with a first preferred embodiment of the present invention.
Figure 3:
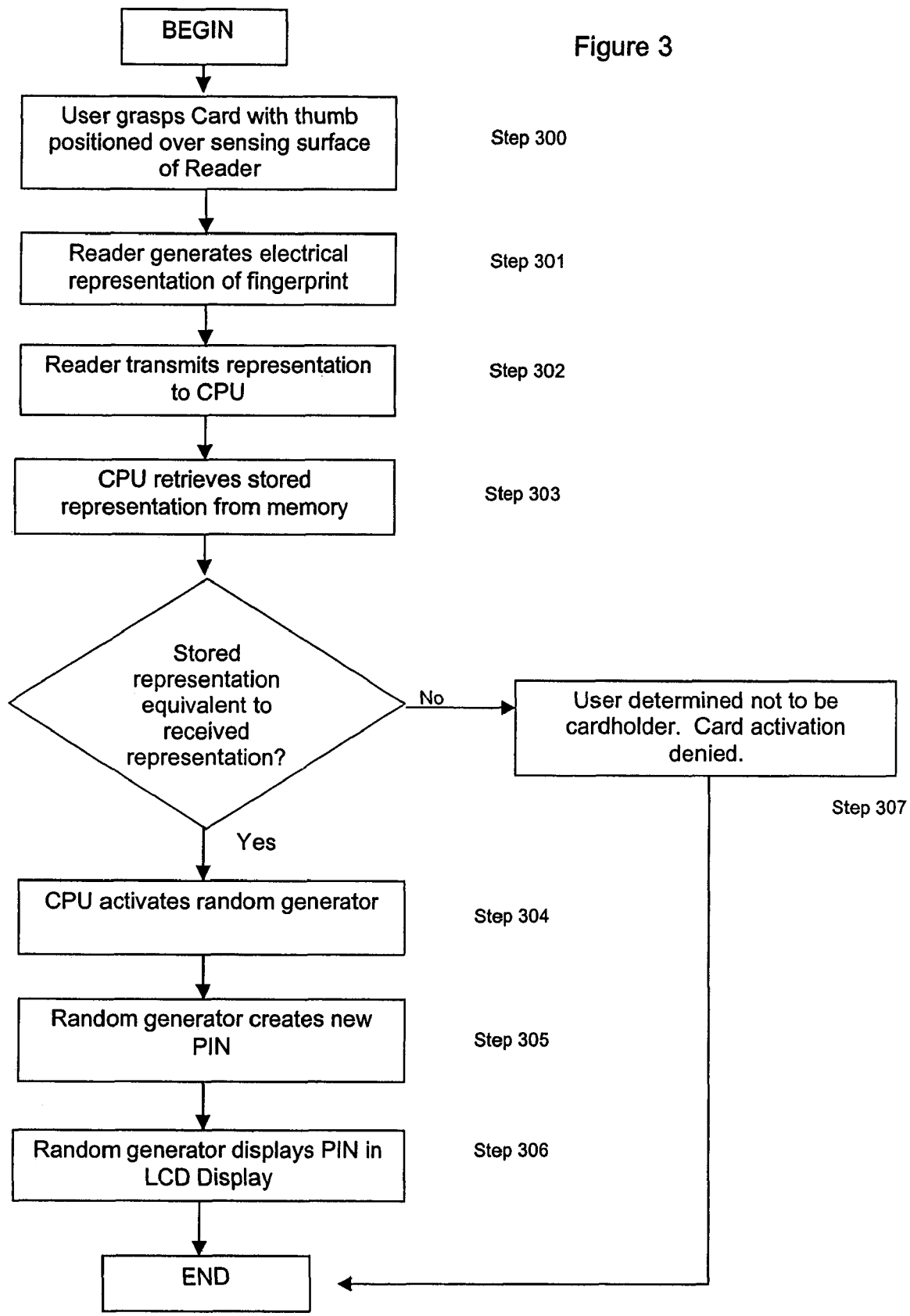
FIG. 3 is a flow diagram depicting a method of activating the card 10 in accordance with a preferred embodiment of the present invention.

Card 10 comprises a card authenticating system 20. FIG. 2 and FIG. 3 are a block diagram and flow diagram, respectively, depicting the card authentication system 20 and method in accordance with a preferred embodiment of the present invention. Card system 20, coupled to sensing area 11, comprises a clock 23, a pseudorandom number generator 24, a comparator 22, a central processing unit (CPU) 27, a reader 21, a memory 25, and a power source 26. Power source 26 is coupled to all components of card 10 that require a power source in order to function, for example, reader 21 and clock 23. Power source 26 may be any power source, such as a battery, or a solar cell, or combinations thereof which are small enough to fit in a standard size credit card, and powerful enough to provide enough power to the components requiring such. A capacitor may also be used in combination with the power source, providing any delta in the required power provided by the power source during activation and use.

CPU 27, coupled to clock 23, comparator 22, random generator 24, memory 25, and reader 21, controls the initialization of card 10, as well as, the flow of information between and among the other components, including verifying that the cardholder is authorized to use card 10. The initialization of card 10 will be disclosed below.

Clock 23, coupled to CPU 27 and random generator 24, forwards the clock signal to random generator 24. Random generator 24, coupled to CPU 27, display 12 and clock 23, generates a pseudo-random code each time card 10 is activated by an authorized cardholder, as disclosed below. A code generator algorithm is used by random generator 24 in order to generate a pseudo-random code that can be duplicated by a psuedo-random generator at a card issuer's network. It should be noted that the code generated by random generator 24 is preferably an alphanumeric code, but a code having only numbers or only letters may also be generated. It is preferable that the code generator algorithm be distinct for each cardholder, thereby ensuring that the code generated by random generator 24 is associated with the authorized cardholder.

CPU 27 forwards an authorization signal to random generator 24 once CPU 27 confirms that the user is the authorized cardholder. Based on the code generator algorithm, which could be, and is preferably, different for each of a plurality of cardholders, random generator 24 generates a random code, which is then used as the PIN for the card during the next transaction. Preferably, another code is generated each time the card senses the touch of a thumb or finger, and the generated code is valid only for the single transaction, thereby requiring a new code for each transaction. Display 12 receives the PIN number from random generator 24 and displays it to the cardholder.

If CPU 27 forwarded an authorization signal that indicated the user was not the authorized cardholder, display 12 would display an error message. Alternatively, when the user is found to be unauthorized, display 12 is not activated. Although random generator 24 is illustrated as separate from CPU 27, it should be noted that generator 24 and CPU 27 may be combined as one component of card system 20.

In a preferred embodiment, wherein the operation of the disclosed invention is exemplified, without intended limitation, reader 21, coupled to CPU 27, sensing area 11 and power source 26, receives a signal from sensing area 11 indicative of the presence of a finger on its surface, for example the thumb of the user. (Step 300). In response to receipt of a signal from sensing area 11, reader 21 translates the biometric signal, e.g., the imprint from the finger or thumb, into a fingerprint signal (Step 301) that is forwarded to CPU 27 along with a signal requesting the activation of card 10 (verification of an authorized user). (Step 302). The method by which reader 21 translates the fingerprint of the user into a usable signal may be any method known in the art for reading fingerprints electronically.

CPU 27 then forwards a request signal to memory 25 in response to the request for activation by reader 21. Memory 25, coupled to CPU 27, stores, for example, an authorized fingerprint signal of the authorized cardholder, which it receives after initialization by CPU 27, as disclosed below. Once memory 25 receives a request signal from CPU 27, memory 25 forwards the stored authorized fingerprint signal to CPU 27. (Step 303). CPU 27 then forwards the fingerprint signal from reader 21 and the authorized fingerprint signal from the memory 25 to comparator 22.

Comparator 22, coupled to CPU 27, receives the signals from CPU 27 and determines whether the user is the authorized cardholder. Comparator 22 compares the signals received from CPU 27 relating to the stored and generated fingerprint representations, and outputs a signal to CPU 27, which is indicative of whether the stored fingerprint representation is equivalent to the generated fingerprint representation.

As stated above, if the signal from comparator 22 indicates that based upon the user's fingerprint or other biometric signal, the user is the authorized cardholder, then CPU 27 activates generator 24 (Step 304) and generates a PIN number (Step 305), which is displayed to the user. (Step 306) Otherwise, no PIN is displayed to the user or an error message is displayed (Step 307).

In practice as exemplified above, preferably but without intended limitation, the user must first initialize card 10 before the user is able to use card 10 to conduct any transactions. The user initializes card 10 using the following preferred procedure, although other procedures may be required by the device issuer. The user must first remove the protective covering from the surface of card 10. Zeros will flash in the display. The user then presses a first finger onto the sensing area. Programming within the card will confirm that it appears to be a fingerprint and will flash, e.g., 1 in the display. The user then removes his/her first finger and the card will display a steady first number. The first finger is again pressed onto the sensing area a second time which results in a second number flashing on the display. The first finger is again removed from the sensing area. The process is again repeated and the user presses the first finger onto the sensing area a third time, and, a third number will then flash. If the three readings all compare, as the same or equivalent, a fourth number is displayed.

If the readings do not compare and are not equivalent, the third number remains steady and unchanged. To activate card 10 the user will need to continue to press the sensing area until the fourth number is displayed. Once the fourth number is displayed, the user may activate the card using practices commonly used by credit card companies. This involves calling an 800 telephone number and entering personal information and information from the card. The user will then be asked to place his/her first finger on the sensing area of the card and then enter the generated PIN number displayed on the card. If the PIN number generated by card 10 is correct, card 10 is ready for use.

Although the card has been disclosed as requiring only a first fingerprint, a second fingerprint or a thumbprint may also be used to provide further protection against the unauthorized use of the card. Accordingly, although the exemplified embodiment is disclosed for simplicity in terms of a "fingerprint," the term is broadly intended to include the alternative use of other digits.

Figure 4:
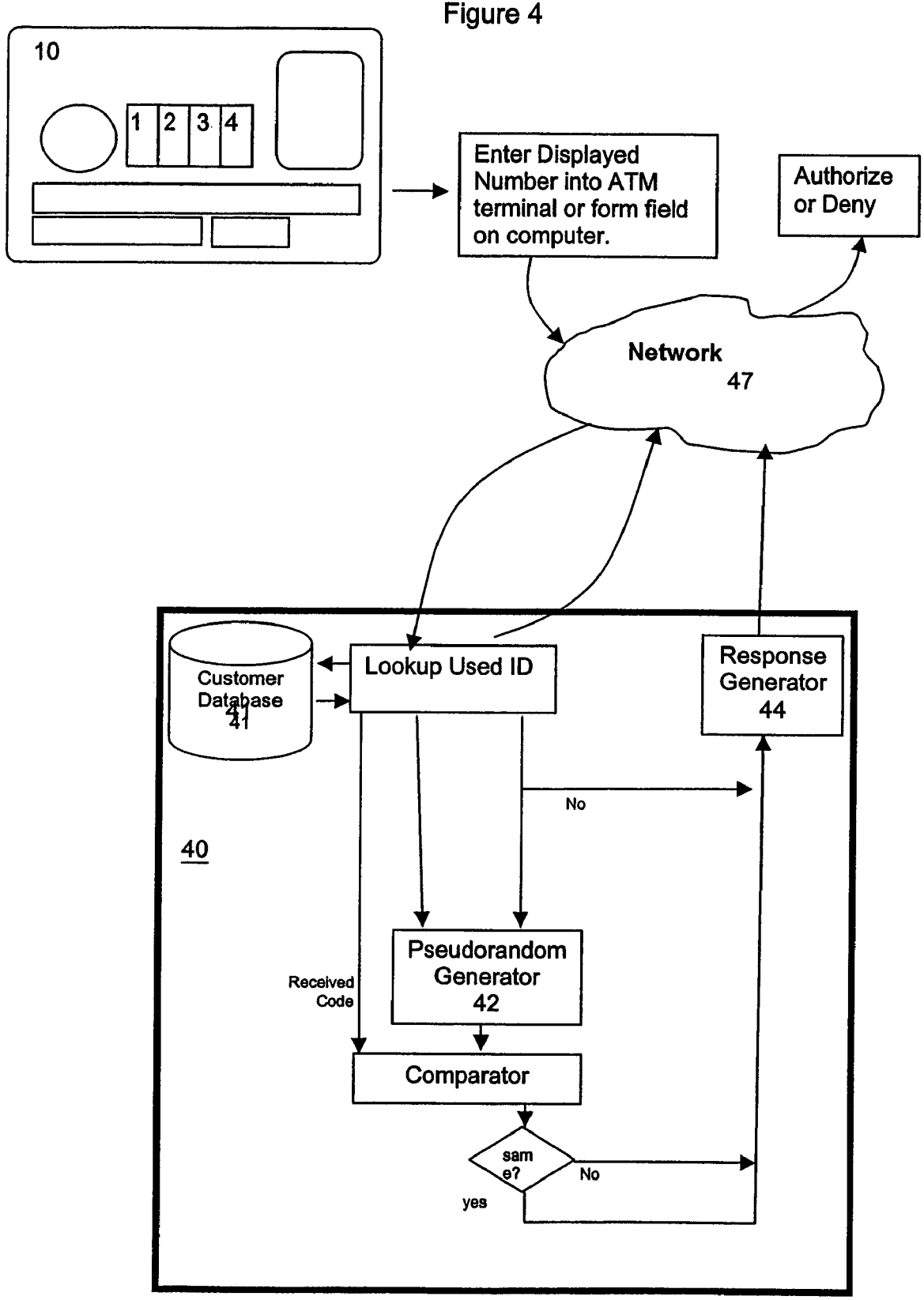
FIG. 4 is a block diagram of an exemplary issuer network in accordance with a preferred embodiment of the present invention.

Once the card has been activated, and card 10 has generated a PIN number for the transaction, the user enters the PIN number into a card terminal or form field on a computer, for example. The PIN number entered by the cardholder is then forwarded to the device issuer through a network coupled to the device used by the cardholder to enter the PIN number. FIG. 4 is an exemplary block diagram of an issuer network in accordance with a preferred embodiment of the present invention. The issuer network utilized in the exemplary system shown in FIG. 4 is a network for a credit card issuer. It should be noted though that the issuer network may be associated with any device issuer. Network 47 may be any means of connecting a user to a device issuer, i.e., the internet, a LAN, or the credit card and ATM networks. Network 47 forwards account information and PIN number to the card issuer's network 40 for verification and authorization. The card issuer's network 40 comprises a customer database 41, an issuer random generator 42, a comparator 43 and a response generator 44. The information forwarded by network 47 is received by customer database 41, which looks up the user's account, confirming a valid account number. If card 10 is a credit or debit card being used to purchase an item from a merchant, customer database 41 also confirms that the available credit is greater than the amount of the transaction. A verification signal is then generated by database 41, and forwarded to the response generator 44 indicating whether the card is valid, and, if applicable, whether the transaction meets the card issuer's purchase criteria. Customer database 41 also forwards an initialization signal to the issuer generator 42, which preferably comprises the cardholder's code algorithm.

Issuer generator 42 then generates an issuer code in accordance with the received code algorithm of the cardholder. This issuer code, along with the PIN number received from the cardholder, are forwarded to the issuers comparator 43 and compared. If the PIN number from the cardholder and the issuer's code are the same, comparator 43 forwards an authentication signal indicative of the authentication of the cardholder to the response generator 44. Otherwise, the authentication signal indicates that the cardholder is not authorized to use the card, thereby refusing the transaction or refusing the cardholder remote access for example.

Although a preferred embodiment is described as a card, any device may be utilized having an authentication system as disclosed herein, e.g., a keyfob.

This invention reduces the cost and complexity of implementing and maintaining a 3-Factor solution in two ways. First, because the user's PIN is simply entered onto computer log-on screens or existing Mag swipe or smart card readers, there is no need to install and maintain expensive biometric readers at the point of transaction. Also, while special readers are not required to use the present invention, it can also work with existing magnetic swipe or Smart Card readers and with ATM machines.

Second, the highly complicated and expensive undertaking of creating and maintaining a database of biometrics is not required because the fingerprint image is stored and matched only on the card itself. The card displays a one-time PIN code when there is a positive match and it is this PIN that is verified by the system, not the biometric. An additional benefit of this feature is that the user's biometric identity remains completely private and within his control. Privacy is further assured because the fingerprint is never transmitted off the device to a reader.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

I claim:

1. A user device for accessing information comprising an authentication system for certifying that the user of the device is the authorized user, the authentication system comprising:
   a reader on the user device for sensing and reading a fingerprint of a user;
   a memory for storing an authorized fingerprint on the user device;
   a comparator on the user device, responsive to the reader and memory, for comparing the read fingerprint to the stored fingerprint;
   a pseudo-random generator on the user device, responsive to the comparator, for generating a pseudo-random personal identification number (PIN) in accordance with a user specific algorithm when the read fingerprint and the stored fingerprint are equivalent; and
   a display on the user device for displaying said PIN, said PIN being forwarded by said user to an issuer of said user device which grants access to said information;
   wherein said issuer receives said PIN at an issuer network that comprises:
   a customer database having customer information for a plurality of users;
   an issuer pseudo-random generator, responsive to said customer database, for generating a pseudo-random customer code, wherein said customer code is generated in accordance with said user specific algorithm, and an issuer comparator, coupled to said customer database and said issuer generator, for comparing said customer code to said PIN, wherein the user is authorized and the device activation verified to access information when said customer code is equivalent to said PIN.

2. The user device of claim 1, which is a card readable by a standard credit card reader.

3. The user device of claim 1, which is a smart card.

4. The user device of claim 1, which is a keyfob.

5. A method for verifying that a user of a device is an authorized user in order to access information, the method comprising:

sensing and reading a fingerprint of a user of the device;

comparing the read fingerprint with a fingerprint of the authorized user stored on the device;

generating a pseudo-random personal identification number (PIN) in accordance with a user specific algorithm when said read fingerprint is equivalent to the stored fingerprint, said PIN being used to verify activation of said device for accessing information;

displaying said PIN to said authorized user on said device;

transmitting said PIN to an issuer of said device;

generating a pseudo-random customer code in response to the receipt by said issuer of said PIN; comparing said customer code to said PIN; and verifying said user and activation of said device for accessing information when said customer code is equivalent to said PIN;

wherein said issuer grants access to said information when said PIN is equivalent to an issuer generated code.

6. A system wherein an authorized user can access information through an access device issuer comprising:

an access device, including an authentication system for verifying that a user of the device is the authorized user, wherein the authentication system comprises:

a reader for sensing and reading a fingerprint of a user;

a memory for storing an authorized fingerprint;

a comparator, responsive to the reader and memory, for comparing the read fingerprint to the stored fingerprint; and a pseudo-random generator, responsive to the comparator, for generating a pseudo-random personal identification number (PIN) in accordance with a user specific algorithm when the read fingerprint and the stored authorized fingerprint are equivalent, wherein the user uses the generated PIN to verify activation of the card for accessing information; and an issuer network for receiving said PIN from said user, wherein the network comprises:

a customer database having customer information for a plurality of users;

an issuer pseudo-random generator, responsive to said customer database, for generating a pseudo-random customer code, said customer code generated in accordance with said user specific algorithm; and an issuer comparator, coupled to said customer database and said issuer generator, for comparing said customer code to said PIN, wherein said user and activation of said device for accessing information is verified when said customer code is equivalent to said PIN.

* * * * *